Dec. 14, 1965  E. FISCHER ETAL  3,223,381
GATE VALVE WITH RESILIENT SEALING MOUNTED IN THE VALVE BODY
Filed Sept. 9, 1963  4 Sheets-Sheet 1
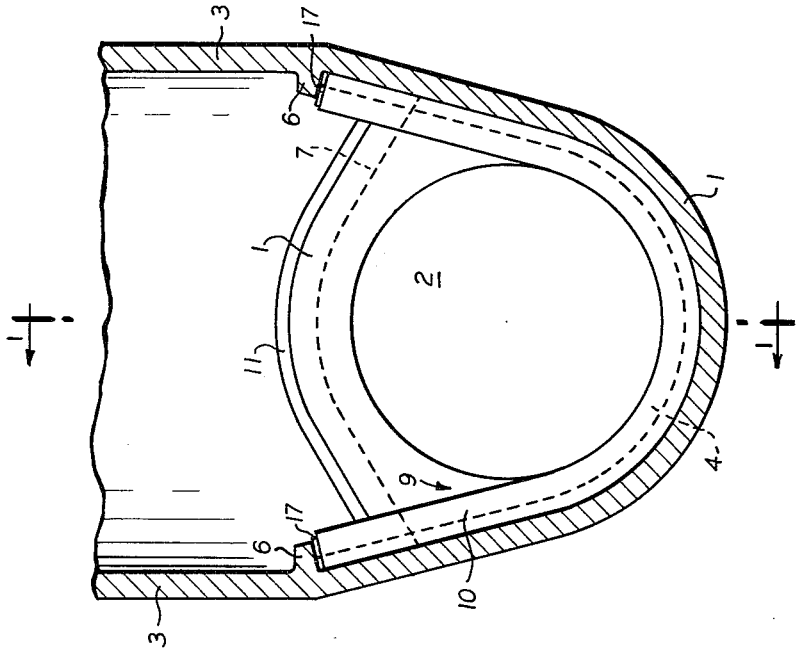
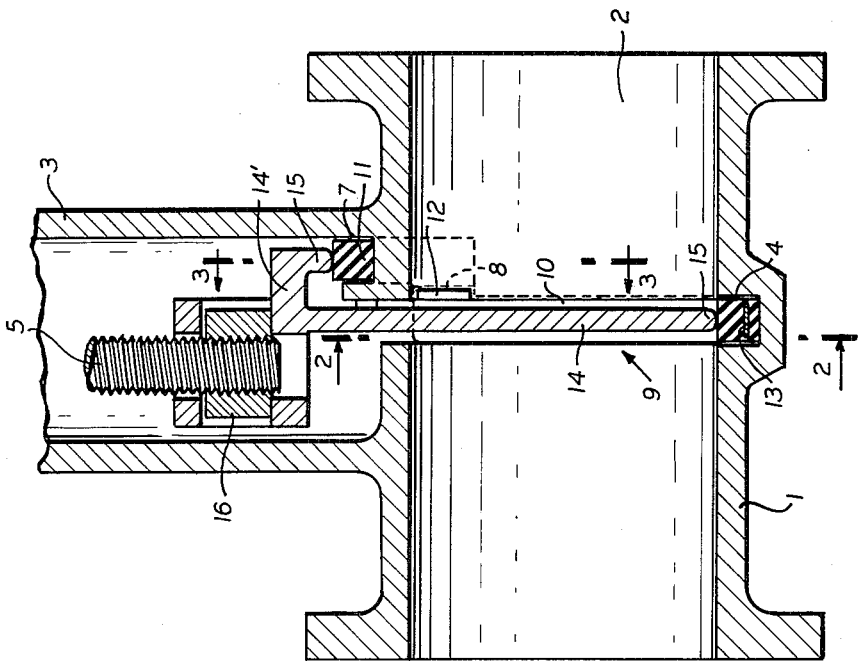
INVENTORS
EUGEN FISCHER
SIEGMAR FÖRSTER
BY
ATTORNEY.

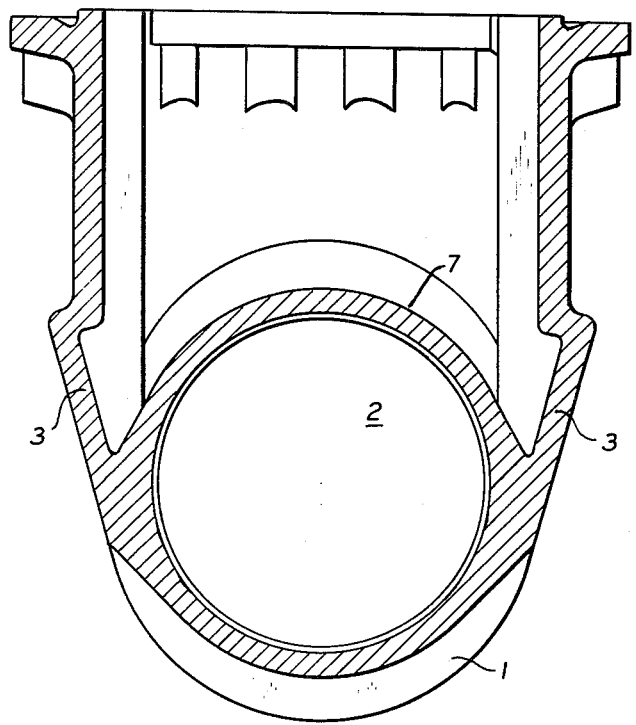
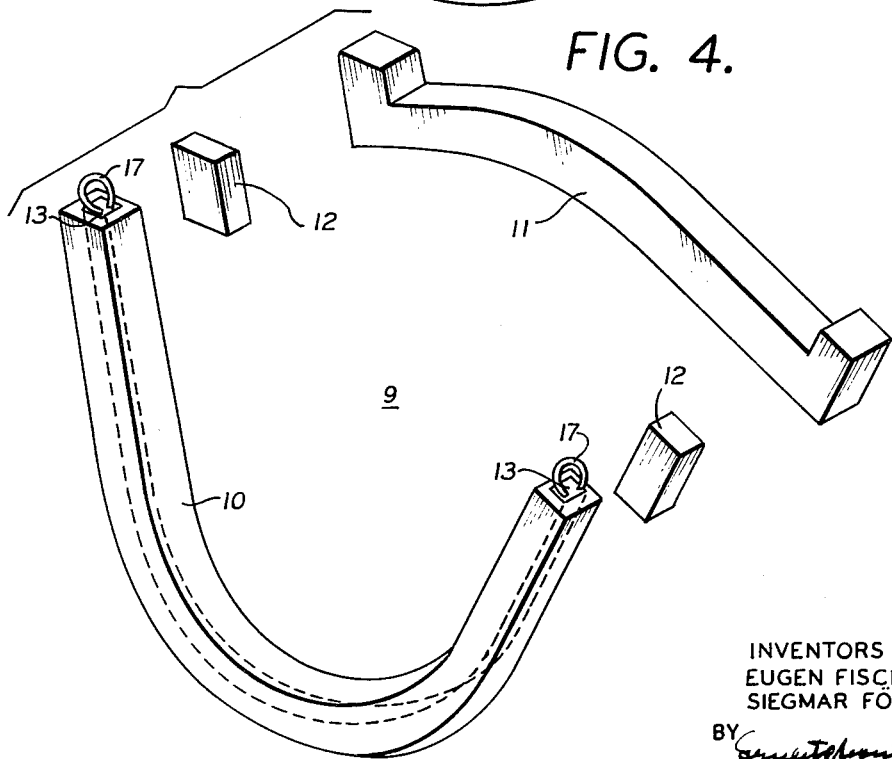

Dec. 14, 1965  E. FISCHER ETAL  3,223,381
GATE VALVE WITH RESILIENT SEALING MOUNTED IN THE VALVE BODY
Filed Sept. 9, 1963  4 Sheets-Sheet 3

INVENTORS
EUGEN FISCHER
SIEGMAR FÖRSTER

BY

ATTORNEY.

Dec. 14, 1965  E. FISCHER ETAL  3,223,381
GATE VALVE WITH RESILIENT SEALING MOUNTED IN THE VALVE BODY
Filed Sept. 9, 1963  4 Sheets-Sheet 4

INVENTORS
EUGEN FISCHER
SIEGMAR FÖRSTER

BY

ATTORNEY.

United States Patent Office 3,223,381
Patented Dec. 14, 1965

3,223,381
GATE VALVE WITH RESILIENT SEALING MOUNTED IN THE VALVE BODY
Eugen Fischer and Siegmar Förster, Heidenhaim, Brenz, Germany, assignors to Johannes Erhard, H. Waldenmaier Erben, Suddeutsche Armalurenfabrik, Brenz, Germany, a corporation of Germany
Filed Sept. 9, 1963, Ser. No. 307,440
Claims priority, application Germany, Sept. 29, 1962, E 23,614
5 Claims. (Cl. 251—328)

The present invention relates to a gate valve having a resilient sealing mounted in the valve body, which gate valve includes a V-shaped closing disc adjustable perpendicularly to the axis of the pipe to be closed for example by means of an axially non-displaceable spindle. At its free end, the V-shaped closing disc is rounded off. In the closed position of the gate valve, the disc seals against a sealing of resilient material, such as rubber, synthetic material or the like, mounted in the valve body.

Gate valves are known, in which a closing member of trapezoid shape is provided with a resilient sealing layer on its rounded-off face and on its lateral faces and with a resilient sealing disc at the spindle-side end of the closing member. In the closed position of the gate valve, the resilient sealing layer and the sealing disc are compressed by means of the spindle and seal in radial or axial direction of the pipe to be closed by the gate valve.

In other known gate valves in which the free end of a wedge-shaped closing member is rounded off and which are provided with a flange-like enlargement at the spindle-side end, the resilient layer on the enlargement and on the wedge-shaped closing member is made integrally of one piece. In these valves, the resilient layer on the wedge-shaped closing member consists of two or more sealing ledges, divided into separate areas by cross ledges of the same material. In the closed position of the valve gate, the bottom side of the enlargement and the body wall between the flow passage and the dome piece as well as the surface of the wedge-shaped closing member coming into contact with the wall of the flow passage seal against each other.

Other known gate valves have two resilient sealing rings on both sides of the closing disc, which rings are connected over a portion of their circumference by a resilient bridge, the latter serving as support for the valve disc in its closing position. The sealing rings are provided with rigid reinforcing rings on their inner circumference, the reinforcing rings being held in the body by means of integral projections. The sealing rings have radial outer surfaces and are provided with annular ribs of the same material, which ribs project over the width of the reinforcing rings.

In this design, a large portion of the circumference of the sealing rings on the spindle side is exposed in radial direction at all positions of the disc, the reinforcing rings adhering to the inner circumference of the sealing rings. As the annular ribs of the downstream sealing ring is fully compressed by the downstream side of the closing disc and projected against twisting to the inside by its location at the outer circumference of the downstream sealing ring, as well as by its contact with the closing disc, it is pressed into sealing engagement with the downstream side of the closing disc directly by the pressure of the flow medium. The primary sealing effect attained by compression of the resilient annular rib is thus increased.

A disadvantage of the known gate valves resides in the fact that the body sealing surfaces become uneven in the case of incrustations, so that a tight closure cannot be attained any more. As is known, incrustations occur with many flow media and cause thick deposits on the seat surfaces. Not even by exerting considerable forces on the spindle and thus on the closing member can the resilient layer of the closing member, depending upon the type of gate valve, be deformed sufficiently in axial or radial direction to overcome the unevenness and to attain a tight closure. In the case of high flow velocities, particularly during operation of the gate valve in a throttled position, there is the danger of the resilient layers of the closing member being torn off.

Finally, other gate valves are known, which are of short overall length, in which the closing disc in the body is sealed by a resilient sealing with round profile, which sealing surrounds the closing disc at its edges and in the passage through the body and is arranged in a groove.

A disadvantage of these known gate valve designs is the necessity of a split body to enable insertion and, respectively, replacement of the sealing ring.

It is, therefore, one object of the present invention to provide a gate valve with resilient sealing mounted in the valve body, having a free, smooth passage, suitable for flow media that tend to incrustations and requiring only a small effort to attain a leak-tight shut-off.

It is another object of the present invention to provide a gate valve with resilient sealing mounted in the valve body, in which a lower strap of the resilient sealing is embedded in a groove provided in the inner face of the wall defining a flow passage and an upper strap of the sealing is embedded in a groove provided in the outer face of the wall defining the flow passage within the body, the seams of both straps being bridged by means of webs, which are placed in grooves of the same walls, which grooves are disposed parallel to the axis of the pipe to be closed.

It is still another object of the present invention to provide a gate valve with a resilient sealing mounted in the valve body, in which the sealing is replaceably mounted in the body grooves and pre-tensioned by a spring, the free ends of the sealing being held by abutments projecting inwardly from the wall of the valve body. The material chosen for the resilient sealing may be such that it tends to accept incrustations, such as calcareous deposits and the like, or a material that rejects incrustations. In the case of sealings that accept incrustations, the latter is split off during the closure of the valve owing to the deformation of the resilient material, a tight closure thus being ensured. The profile of the sealing is adapted to the cross-section of the grooves in a manner that there are intermediate spaces which allow for the accommodation of the resilient deformation of the sealing material.

It is yet another object of the present invention to provide a gate valve with a resilient sealing mounted in the valve body, in which the closing disc is provided at its free end, as well as at the flange-like enlargement near the spindle, with a continuous rim which acts together with the one-part or multiple-part sealing, in a way that all sealing forces act in planes that are perpendicular to the flow passage, stresses on the valve body in the closed position thus being avoided. Stresses in the pipe lines that act on the gate valve do not influence the leak-tightness of the closure, as the resilient sealing can compensate for deformations of the body. In the closed position of the valve, the flow medium in the dome piece and in the flow passage including the pipe opposite the resilient sealing can drain completely, thus enabling a re-packing of the stuffing box at the spindle and preventing damage of the valve body at temperatures below the freezing point. Furthermore, in the case of varying flow media, it is ensured that residual liquids do not remain in the dome piece.

It is also a further object of the present invention to provide a gate valve with two or more sealings in the valve body, which sealings are arranged symmetrically to the spindle. At its free ends, a spring can be provided with eyelets or the like to enable the connection thereto of a clamping device for easy mounting or replacement of the sealing.

With these and other objects in view, which will become apparent in the following detailed description, the present invention will be clearly understood in connection with the accompanying drawings, in which:

FIGURE 1 is a central vertical section through the gate valve in the direction of the longitudinal axis of the pipe to be closed;

FIG. 2 is a section along the lines 2—2 of FIG. 1, the closing disc being removed for the purpose of better demonstration;

FIG. 3 is a section along the lines 3—3 of FIG. 1, the closing disc being likewise removed;

FIG. 4 is a perspective, exploded view of the sealing means;

Figure 6:
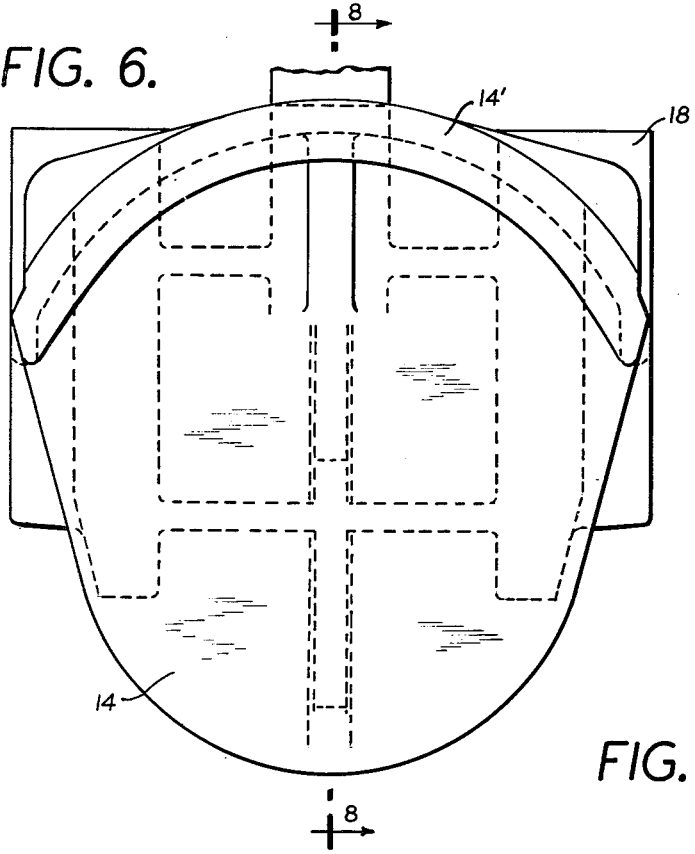
FIG. 6 is an elevation of the closing disc.
Figure 8:
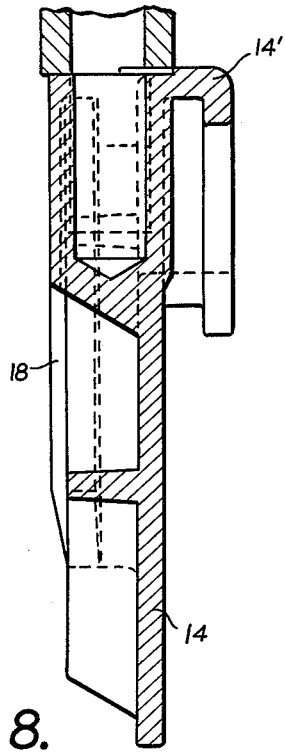

FIG. 8 is a section along the lines 8—8 of FIG. 6. a continuous rim 15 which engages the sealing strap Referring now to the drawings, the gate valve comprises a valve body 1 defining a flow passage 2, and a dome piece 3.

The valve body 1 is equipped with a groove 4 cut into the inner face of the valve body 1 and disposed in a plane perpendicularly to the axis of the flow passage 2, and with a groove 7 cut into the outer face of the valve body 1 and disposed in a plane axially spaced apart from and parallel to the plane of the groove 4, which grooves 4 and 7 terminate at their ends at abutments 6 projecting inwardly from the wall of the valve body 1. The grooves 4 and 7 are connected with each other by grooves 8 on both sides of the flow passage 2, at about the ends of the groove 7, which grooves 8 are disposed in axial direction of the passage flow 2. Sealing means 9 of resilient material, as rubber, plastic or the like, as shown in FIG. 4, are inserted in the grooves 4, 7 and 8, respectively. The sealing means 9 comprises a lower strap 10, an upper strap 11 and two webs 12 are disposed in axial direction of the valve body 1 and connect the grooves 4 and 7, yet the members 10, 11 and 12 can also be made integrally of one piece.

A spring 13 of, for example, square, rectangular or round profile or a helical spring, is inserted in the lower strap 10 of the sealing means 9. The latter are thus mounted in a pre-tensioned position in the grooves 4, 7 and 8 and held at its free ends by abutments 6 projecting inwardly at about the joint between the valve body 1 and the dome piece 3. In a similar way, the strap 11 and the webs 12 can also be equipped with springs (not shown). At each of the ends of these springs eyelets 17 or the like can be provided. Clamping devices (not shown) can be connected to the eyelets 17, in order to enable an easy insertion or replacement of the sealing means 9, and in particular of the sealing strap 10 in the valve body 1.

Figure 5:
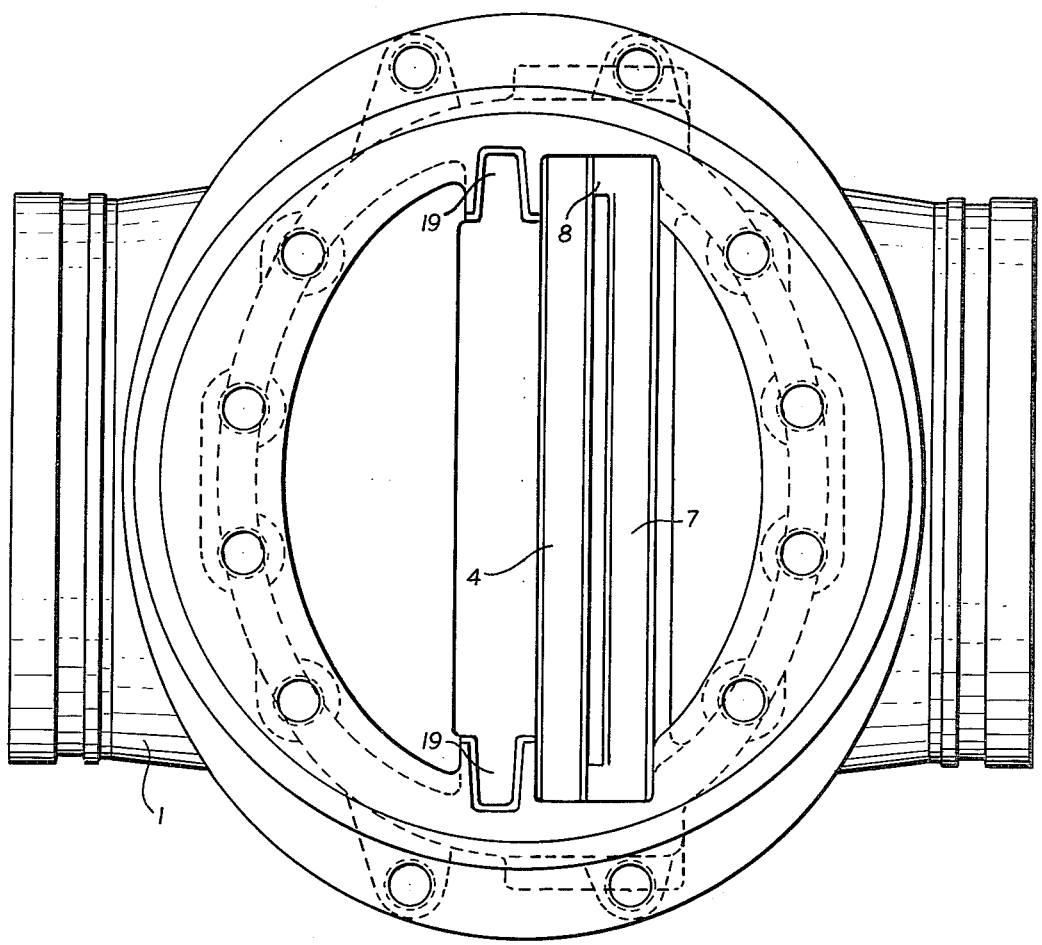
FIG. 5 is a top plan view of the valve body.
Figure 7:
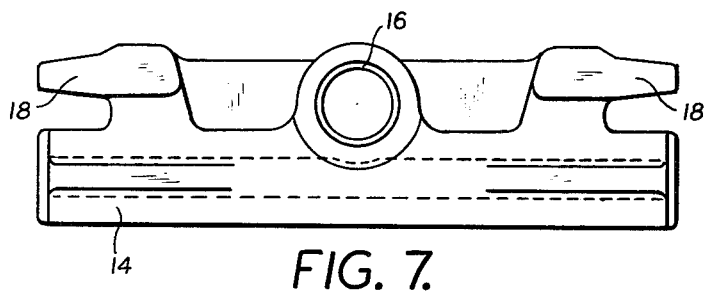
FIG. 7 is a top plan view thereof.

The gate valve also comprises a closing disc 14 disposed in the valve body 1 and to be inserted therein for engagement with the sealing straps 10 and 11. At its free end, as well as near a spindle 5 on a flange-like enlargement 14' of the closing disc 14, the latter has 11 in the closed position of the gate valve. The closing disc 14, which is guided in the valve body 1 in conventional manner by means of guide fins 18 (FIG. 7) received in complementary guide grooves 19 (FIG 5) provided in the inner face of the valve body 1 adjacent the groove 4, can be moved perpendicularly to the direction of the flow passage 2 towards the sealing means 9 or in opposite direction by means of the spindle 5, threadedly connected with a spindle nut 16 inserted into a recess of the flange-like enlargement 14' of the valve disc 14.

The straps 10 and 11 and the webs 12 of the sealing means 9 have a cross-section which is smaller than that of the grooves 4, 7 and 8. Thus there are intermediate spaces between the grooves and the sealing means, which spaces allow for a resilient deformation of the material of the sealing means 9 upon engagement of the latter with the closing disc 14.

While we have disclosed one embodiment of the present invention, it is to be understood that this embodiment is given by example only and not in a limiting sense, the scope of the present invention being determined by the objects and the claims.

We claim:

1. A gate valve comprising
a valve body defining an axial passage therethrough and having an inner face and an outer face,
a dome piece projecting from the outer face of said valve body,
said dome piece being connected with said passage by an opening,
a non-rising threaded spindle disposed in said dome piece,
said inner face of said valve body having a first groove disposed in a plane perpendicular to the longitudinal axis of said passage and leading toward said opening in said valve body,
said outer face of said valve body having a second groove longitudinally spaced apart from said first groove and extending substantially for the length of said opening in said valve body,
said second groove terminating at a point overlapping said first groove,
said valve body having a third groove connecting the ends of said second groove with said first groove,
sealing means disposed in said first groove, in said second groove, and in said third groove,
said latter sealing means comprising a web member disposed in said third groove and connecting said sealing means of said first groove and of said second groove,
said first and second grooves including side faces disposed in parallel planes spaced apart from each other along and perpendicular to the axis of said passage,
a closing disc being in part of a configuration complementary to that of said first groove and having a flange-like projection,
said closing disc being disposed and movable in a plane perpendicular to the longitudinal axis of said valve body and including a nut member cooperating with said threaded spindle, to open and to close, respectively, said closing disc,
said disc engaging said sealing means disposed second groove on top of said last mentioned sealing means,
said closing disc and said flange-like projection having a continuous rim means for engagement with said sealing means in the closing position of said closing disc, and
said threaded spindle being disposed eccentrically relative to said closing disc.

2. The gate valve, as set forth in claim 1, wherein said sealing means of said first groove, of said second groove and said third groove comprise integrally a single unit.

3. The gate valve, as set forth in claim 1, which includes
an abutment projection at each end of said first groove, and
resilient means embedded in said sealing means of said first groove, and
said sealing means is retained exchangeably in said first groove under pretension by said resilient means and ends of said sealing means engaging said abutments, 4. The gate valve, as set forth in claim 3, wherein said resilient means comprises a spring, and eye formations are secured to each end of said spring.

5. The gate valve, as set forth in claim 1, wherein said sealing means have a cross-section smaller than that of said grooves, in order to provide space for a resilient deformation of said sealing means in their operative position upon engagement with said closing disc.

References Cited by the Examiner
UNITED STATES PATENTS
260,936  7/1882  Callahan _____ 251—328 X FOREIGN PATENTS
206,712  12/1959  Austria.
533,935  12/1956  Canada.
2,711    1874    Great Britain.

M. CARY NELSON, *Primary Examiner.*